United States Patent
Nambudiri et al.

(10) Patent No.: US 7,163,294 B2
(45) Date of Patent: Jan. 16, 2007

(54) METHOD AND APPARATUS FOR PROVIDING AN INTERFACE BETWEEN A LIQUID CRYSTAL DISPLAY CONTROLLER AND A LASER PROJECTION DISPLAY

(75) Inventors: Narayan Nambudiri, Kings Park, NY (US); Paul Dvorkis, E. Setauket, NY (US); Ron Goldman, Cold Spring Harbor, NY (US); Carl Wittenberg, Water Mill, NY (US); Chinh Tan, Setauket, NY (US); Miklos Stern, Woodmere, NY (US); Dmitriy Yavid, Stony Brook, NY (US); Frederick F. Wood, Medford, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 149 days.

(21) Appl. No.: 10/930,721

(22) Filed: Aug. 31, 2004

(65) Prior Publication Data
US 2005/0152012 A1    Jul. 14, 2005

Related U.S. Application Data

(60) Provisional application No. 60/533,916, filed on Dec. 31, 2003.

(51) Int. Cl.
*G03B 21/00* (2006.01)
*G03B 21/26* (2006.01)
(52) U.S. Cl. .......................... 353/31; 353/37

(58) Field of Classification Search ............... 353/30, 353/31, 34, 37, 98, 99; 359/202
See application file for complete search history.

(56) References Cited

U.S. PATENT DOCUMENTS

| | | | | |
|---|---|---|---|---|
| 5,032,924 A | * | 7/1991 | Brown et al. | 348/759 |
| 5,191,187 A | * | 3/1993 | Kajikawa | 219/121.76 |
| 5,214,419 A | * | 5/1993 | DeMond et al. | 345/32 |
| 5,311,321 A | * | 5/1994 | Crowley | 348/760 |
| 5,700,076 A | * | 12/1997 | Minich et al. | 353/31 |
| 5,920,361 A | * | 7/1999 | Gibeau et al. | 348/750 |
| 6,018,408 A | * | 1/2000 | Hong | 359/201 |
| 6,351,324 B1 | * | 2/2002 | Flint | 359/202 |
| 6,764,183 B1 | * | 7/2004 | Okazaki | 353/31 |
| 6,839,042 B1 | * | 1/2005 | Conemac et al. | 345/32 |
| 6,945,652 B1 | * | 9/2005 | Sakata et al. | 353/30 |

OTHER PUBLICATIONS

International Search Report PCT/US2004/042838 dated Mar. 8, 2005.

* cited by examiner

*Primary Examiner*—Rodney Fuller
(74) *Attorney, Agent, or Firm*—Kirschstein, et al.

(57) ABSTRACT

An apparatus is provided for controlling a laser projection device (LPD). The apparatus is comprised of a liquid crystal display controller, a laser projection display controller, and a laser projection display engine. The liquid crystal display controller is adapted to receive video signals indicative of a visual display and convert the video signals to control signals suitable for controlling a liquid crystal display panel. The laser projection device controller is adapted to receive the control signals from the liquid crystal display controller and use the control signals to control a laser projection display. The laser projection device engine is adapted to display an image under the control of the laser projection device controller.

9 Claims, 4 Drawing Sheets

METHOD AND APPARATUS FOR PROVIDING AN INTERFACE BETWEEN A LIQUID CRYSTAL DISPLAY CONTROLLER AND A LASER PROJECTION DISPLAY

CROSS REFERENCE TO RELATED APPLICATION

This application claims the benefit of U.S. Provisional Application Ser. No. 60/533,916, filed Dec. 31, 2003.

BACKGROUND OF THE INVENTION

1. Field of the Invention

This invention relates generally to electronic displays, and, more particularly, to a Laser Projection Display (LPD) that may be driven by a Liquid Crystal Display (LCD) controller.

2. Description of the Related Art

Recently, optical devices employing two or more lasers projected to a common location have been developed. For example, in a color laser projection device (LPD), three lasers may be arranged to project on a single, common location. Each of the three lasers has a unique color component and its intensity may be controlled to vary the hue of the combined light appearing at the single, common location. A relatively complex and high definition color display may be produced by scanning the light from the three lasers in a two-dimensional array while controllably energizing each of the lasers.

Heretofore, a variety of other display devices have been developed. For example, the electronics industry has devoted substantial effort and funds to designing and manufacturing Liquid Crystal Display (LCD) panels and electronic controllers necessary to extract images from video signals and manipulate those images to arrive at fine tuned and highly desirable images on the LCD panels. The signals generated by the LCD controllers, however, are not directly compatible with the more newly developed LPDs. Thus, the effort and money invested in LCD controllers may be largely wasted if the LCD panels are substantially replaced by LPDs. Moreover, the use and acceptance of LPDs may be slowed by the time needed to develop relatively complex commercial quality LPD controllers.

The present invention is directed to overcoming, or at least reducing, the effects of one or more of the problems set forth above.

SUMMARY OF THE INVENTION

In one aspect of the instant invention, an apparatus is provided. The apparatus is comprised of a liquid crystal display controller and a laser projection display controller. The liquid crystal display controller is adapted to receive video signals indicative of a visual display and convert the video signals to control signals suitable for controlling a liquid crystal display panel. The laser projection device controller is adapted to receive the control signals from the liquid crystal display controller and use the control signals to control a laser projection display.

In another aspect of the instant invention, an apparatus is provided. The apparatus is comprised of a liquid crystal display controller, a laser projection display controller, and a laser projection display engine. The liquid crystal display controller is adapted to receive video signals indicative of a visual display and convert the video signals to control signals suitable for controlling a liquid crystal display panel. The laser projection device controller is adapted to receive the control signals from the liquid crystal display controller and use the control signals to control a laser projection display. The laser projection device engine is adapted to display an image under the control of the laser projection device controller.

In still another aspect of the instant invention, a method for controlling a laser projection device engine is provided. The method comprises receiving video signals indicative of a visual display, and converting the video signals to control signals suitable for controlling a liquid crystal display panel. Thereafter, the control signals for the liquid crystal display panel are received and converted to signals suitable for controlling a laser projection display

BRIEF DESCRIPTION OF THE DRAWINGS

The invention may be understood by reference to the following description taken in conjunction with the accompanying drawings, in which like reference numerals identify like elements, and in which.

Figure 1:
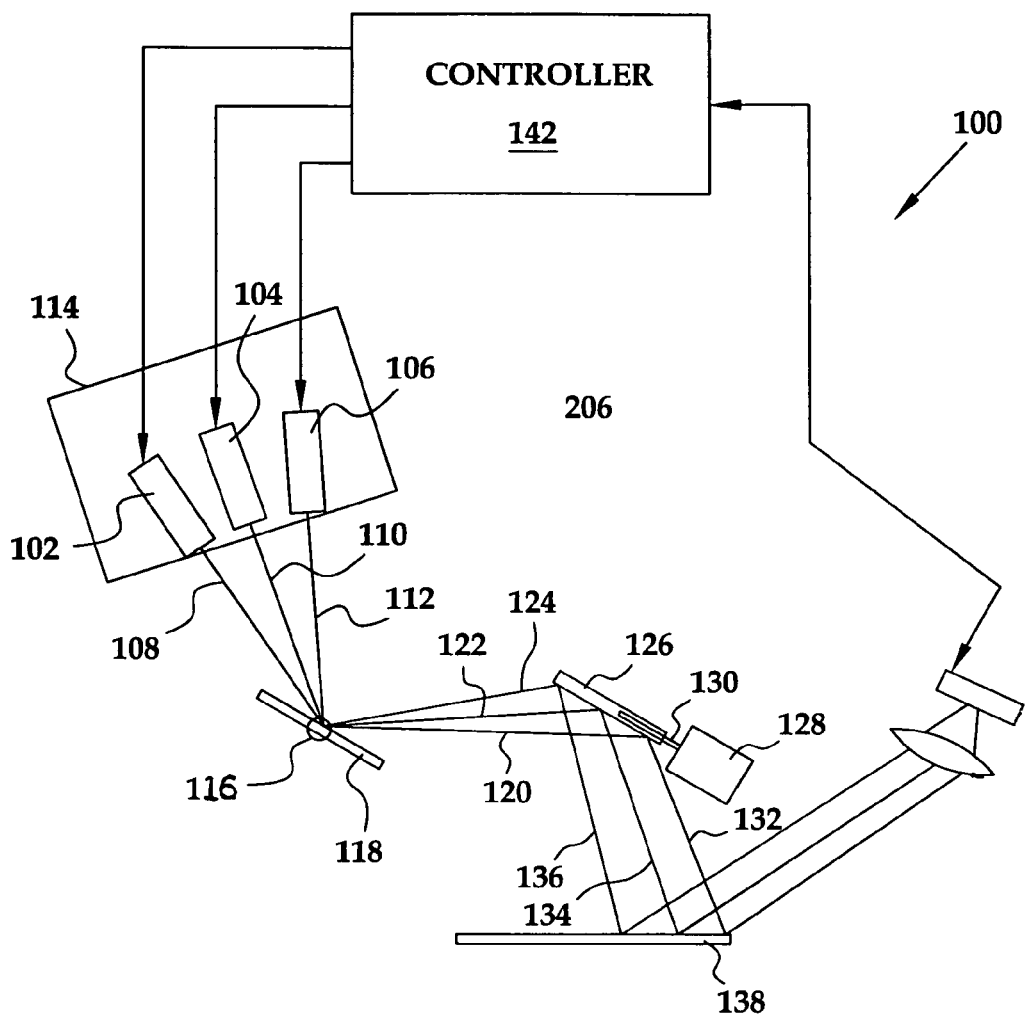
FIG. 1 is a stylistic block diagram of a top level view of one embodiment of a laser projection device (LPD) that may be employed in the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a stylistic block diagram of a laser projection display (LPD) 100, in accordance with one embodiment of the present invention, is shown. In the illustrated embodiment, the LPD 100 includes three lasers 102, 104, 106, each capable of emitting a beam of light 108, 110, 112 consisting of a unique color, such as red, green or blue. Those skilled in the art will appreciate that the number of lasers and the color of light emitted therefrom may be varied without departing from the spirit and scope of the instant invention.

The lasers 102, 104, 106 are arranged in a common plane 114 with the beams of light 108, 110, 112 being angularly directed relative to one another to fall on a substantially common location 116 on a first scanning device, such as a first scanning mirror 118, from where they are reflected as beams of light 120, 122, 124. In the illustrated embodiment, the first scanning mirror 118 oscillates on an axis at a relatively high rate (e.g., about 20–30 KHz). Rotation or oscillation of the first scanning mirror 118 causes the beams of light 108, 110, 112 to be moved. That is, as the angular position of the first scanning mirror 118 alters, so too does the angle of reflection of the beams of light 120, 122, 124 from the first scanning mirror 118. Thus, as the mirror oscillates the reflected beams of light 120, 122, 124 are scanned to produce movement of the beams of light 120, 122, 124 along one component of the two-dimensional display.

The second component of the two-dimensional display is produced by a second scanning device, such as a mirror 126. In the illustrated embodiment, the second mirror 126 is coupled to a motor 128 at a pivot point 130 so as to produce rotational or oscillating movement about an axis that is substantially orthogonal to the axis of rotation of the first mirror 118. The beams of light 120, 122, 124 are reflected off of the second mirror 126 as beams of light 132, 134, 136 and directed to a viewing surface 138. The viewing surface 138 may take on any of a variety of forms without departing from the spirit and scope of the instant invention. For example, the viewing surface 138 may be a fixed screen that may be front or back lit by the lasers 102, 104, 106 and may be contained in a housing (not shown) that is common with the LPD 100, or alternatively, the viewing surface 138 may take the form of any convenient, generally flat surface, such as a wall or screen, spaced from the LPD 100.

Figure 2:
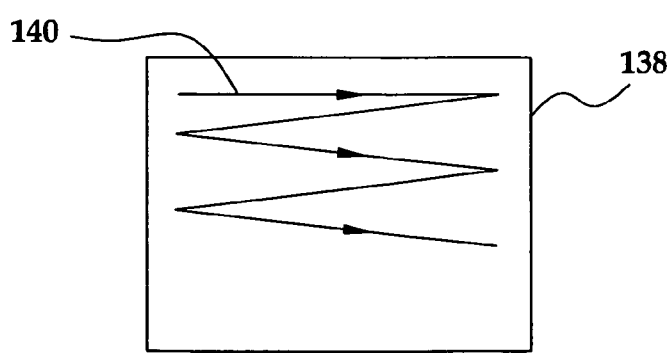
FIG. 2 is a stylistic view of a viewing surface shown in FIG. 1.

The second mirror 126 oscillates or rotates at a relatively slow rate, as compared to the rate of the first mirror 118 (e.g., about 60 Hz). Thus, it will be appreciated that, as shown in FIG. 2, the beams of light 132, 134, 136 generally follow a path 140 on the display surface 138. Those skilled in the art will appreciate that the path 140 is similar in shape and concept to a raster scan commonly employed in cathode ray tube televisions and computer monitors.

While the instant invention is described herein in the context of an embodiment that employs separate first and second scanning mirrors 118, 126, those skilled in the art will appreciate that a similar path 140 may be produced by using a single mirror. The single mirror would be capable of being moved about two axis of rotation to provide the fast and slow oscillating movements along two orthogonal axes.

As is apparent from FIG. 1, owing to the angular positioning of the lasers 102, 104, 106, even though the lasers 102, 104, 106 have been arranged mechanically and optically to deliver the beams of light 108, 110, 112 within the same plane 114 and at the same point 116 on the mirror 118, each has a different angle of reflection, which causes the beams of light 120, 122, 124 to diverge. A controller 142 is provided to controllably energize the lasers 102, 104, 106 to effectively cause the beams of light 120, 122, 124 to be collinear, such that they may be reflected off of the second mirror 126 and delivered to the same point on the viewing surface 138 relatively independent of the distance of the viewing surface 138 from the second mirror 126.

Figure 3A:
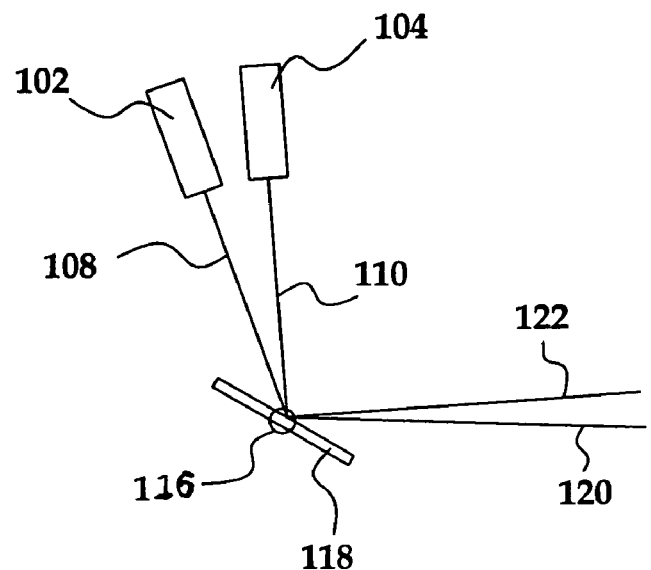
FIGS. 3A and 3B depict a top view of a scanning device at various times during its operation.
Figure 3B:
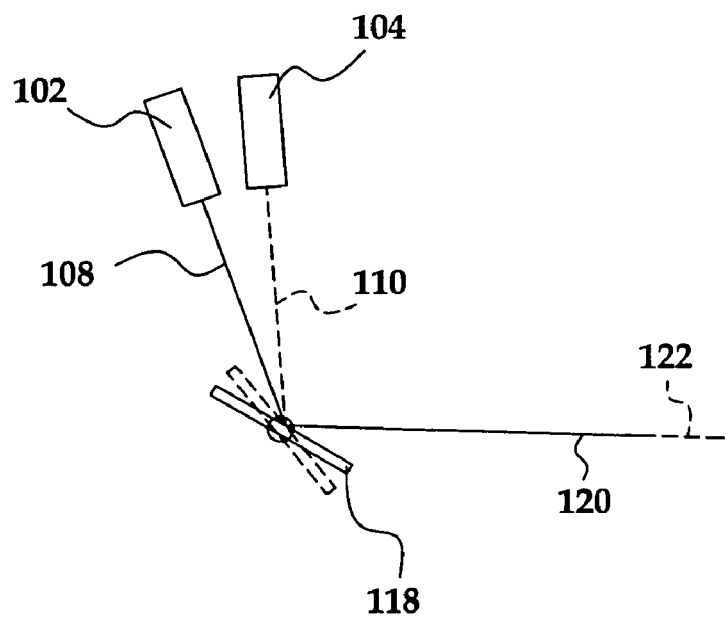

Turning now to FIGS. 3A and 3B, the operation of the controller 142 to cause the beams of light 120, 122, 124 to be collinear is discussed. To simplify the discussion, only two lasers 102, 104 are illustrated in FIG. 3, but those skilled in the art will appreciate that the concepts discussed herein may be extended to three or more lasers without departing from the spirit and scope of the instant invention. As shown in FIG. 3A, if the lasers 102, 104 are energized simultaneously, the reflected beams of light 120, 122 diverge. However, as shown in FIG. 3B, if the lasers 102, 104 are energized at slightly different times, then the beams of light 120, 122 can be made to follow a single, common path (i.e., the beams of light 120, 122 are collinear). For example, if the laser 102 is energized at a first time t1, then the mirror 118 will be at a first position, as represented by the solid lines, and the beam of light 108 will reflect off of the mirror 118 as the beam of light 120. Subsequently, if the laser 104 is energized at a second time t2, then the mirror 118 will be at a second position, as represented by the dashed lines, and the beam of light 110 will reflect off of the mirror 118 as the beam of light 122. By precisely controlling the time t2, the mirror 118 will be in a position to accurately reflect the beam of light 122 along substantially the same path as the beam of light 120.

Thus, through the operation of the controller 142, the beams of light 120, 122 are substantially collinear, but are slightly displaced in time. That is, the beams of light 120, 122 will now both be projected onto substantially the same point on the display surface 138, but at slightly different times. However, owing to the persistence of the human eye, the variation in timing is not detectable. That is, in the case of the three laser system described in FIG. 1, each of the lasers 102, 104, 106 will controllably deliver laser light of a unique color and intensity to substantially the same point on the viewing surface 138 within a relatively short window of time. The human eye will not detect the three separate colors, but rather will perceive a blending of the three light beams such that a consistent and desired hue appears at that point on the viewing surface. Those skilled in the art will appreciate that this process may be repeated numerous times along the path 140 to recreate a picture on the viewing surface 138.

Figure 4:
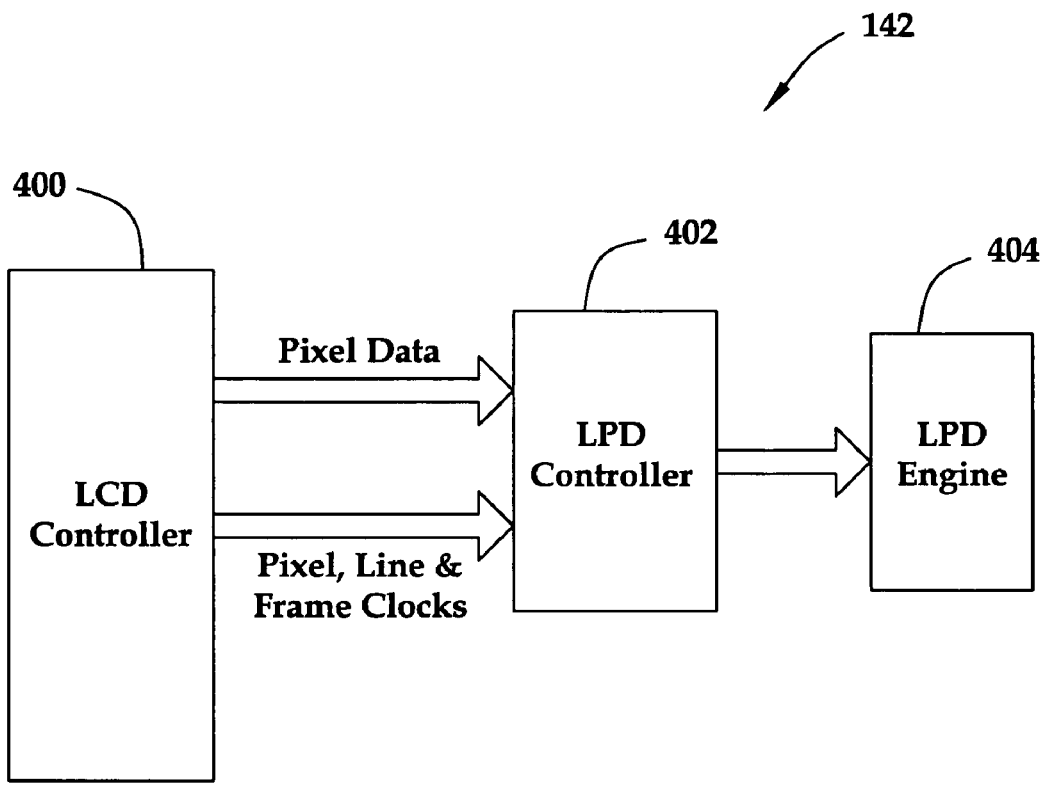
FIG. 4 is a stylized view of one embodiment of the LPD controller of FIG. 1.
Figure 5:
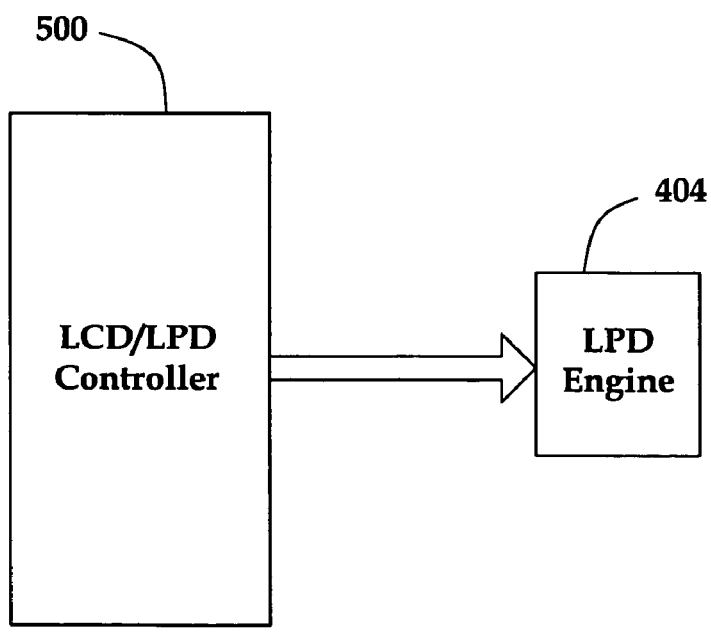
FIG. 5 is a stylized view of an alternative embodiment of the LPD controller of FIG. 1.

FIG. 4 illustrates a stylistic representation of one embodiment of the controller 142. Generally, in the embodiment illustrated in FIG. 4, the controller 142 is comprised of a conventional Liquid Crystal Display (LCD) controller 400 and an LPD controller 402. In this embodiment, The LPD controller 402 is connected to an output terminal of the LCD controller 400. The LPD controller 402 receives signals/information that would normally drive an LCD panel, but in this embodiment the LPD controller 402 uses the LCD panel signals to drive the LPD engine 404 to create a desired display. Thus, the system takes advantage of a conventional LCD controller 400 to do much of the processing, leaving the LPD controller 400 the simpler task of converting the LCD panel signals/information to control and display objects (e.g., text, drawings, icons etc) via the LPD engine 404.

The LCD Controller 400 is conventional in configuration, providing display information/signals, such as pixel color intensity information contained in 16 bits (or more) of data along with a pixel clock for each pixel in the display. This information is received by the LPD controller 402 and rendered via the LPD engine 404, such as the type described above in conjunction with FIGS. 1–3. The LPD controller 402 uses the pixel line and frame clocking information to capture the pixel data and render the information.

In an alternative embodiment of the instant invention, rather than have the LCD and LPD controllers 400, 402 physically separated, a combined LCD/LPD controller 500 is shown. In this embodiment of the instant invention, the LPD controller is embedded in the LCD controller. In this embodiment, the features required to control the LPD engine 404 are added to an LCD controller such that the resulting combined LCD/LPD controller 500 can control either an LCD or an LPD via software, hardware, or firmware control. The combined LCD/LPD controller 500 provides appropriate electrical signals to render images via the LPD engine 404 or a conventional LCD (not shown).

Figure 6:
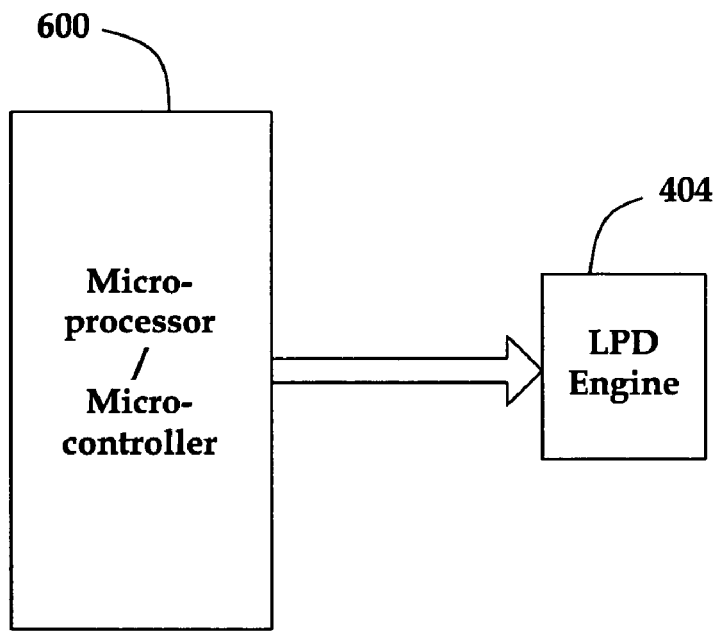
FIG. 6 is a stylized view of an alternative embodiment of the LPD controller of FIG. 1.

As shown in FIG. 6, the LPD controller 402 and/or the combined LPD/LCD controller 500 can take the form of a microprocessor or microcontroller 600. Generally, the functions of the LPD controller 402 may be implemented in the microprocessor/microcontroller 600 through conventional programming techniques. Alternatively, a conventional LCD controller, such as the LCD controller 400, that is formed using a microprocessor/microcontroller can be modified to control the LPD engine 404 or an LCD panel under software control.

Figure 7:
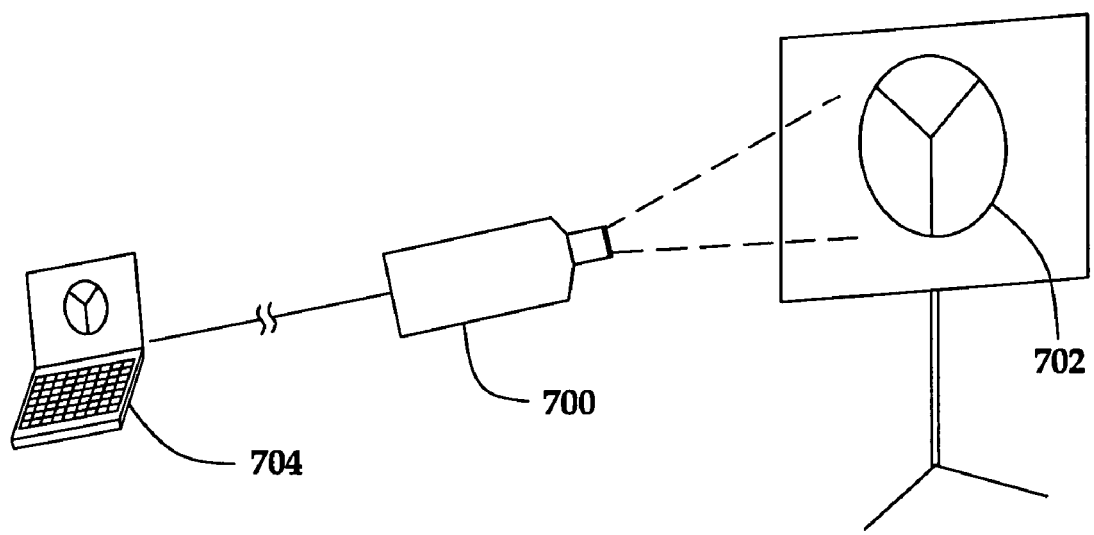
FIG. 7 depicts a stylized view of a projector based embodiment of the instant invention.

The LPD engine 404 can also be used in a projector embodiment as shown in FIG. 7. An LPD based projector 700 is positioned to illuminate a projection screen 702, which may be formed from a material that enhances the display. A source 704 of the displayed information may take on any of a variety of forms, such as a desktop computer, a laptop computer, a PDA, a cell phone, etc. The source 704 may be coupled to the projector 700 via a variety of communication medium, which may be a wired or wireless type connection.

The projector 700 may include the LPD engine 404, as well as the LPD controller 402. The source 704 may include the LCD controller 402, or alternatively, the LCD controller 402 may be included within the projector 700. The projector 700 may also include memory (e.g., semiconductor memory, such as MMC, SD Compact Flash, Memory stick, optical drives, magnetic drives, etc.) that may be used to store data for control or display purposes. For example, images may be stored in the memory and then displayed on the projection screen 702.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. An arrangement for projecting an image on a projection surface, comprising:
    a) a liquid crystal display (LCD) controller for processing input video signals to output LCD signals operative for displaying pixels on an LCD screen;
    b) an image projector for sweeping a laser beam along mutually orthogonal axes as a raster pattern of scan lines, each scan line having a number of pixels; and
    c) a laser projection device (LPD) controller for converting the output LCD signals to LPD control signals operative for controlling the image projector to illuminate selected pixels in the raster pattern as the image on the projection surface.

2. The arrangement of claim 1, wherein the image projector includes a laser for generating the laser beam, a first oscillatable scan mirror for sweeping the laser beam along one of the axes, and a second oscillatable scan mirror for sweeping the laser beam along the other of the axes.

3. The arrangement of claim 1, wherein the image projector includes a plurality of lasers for respectively generating constituent beams which are combined to form the laser beam, a first oscillatable scan mirror for sweeping the laser beam along one of the axes, and a second oscillatable scan mirror for sweeping the laser beam along the other of the axes.

4. The arrangement of claim 1, wherein the LCD controller and the LPD controller are combined into a single controller.

5. The arrangement of claim 1, wherein the output LCD signals include pixel data, line data and clock data.

6. A method of projecting an image on a projection surface, comprising the steps of:
    a) processing input video signals to output liquid crystal display (LCD) signals operative for displaying pixels on an LCD screen;
    b) sweeping a laser beam along mutually orthogonal axes as a raster pattern of scan lines, each scan line having a number of pixels; and
    c) converting the output LCD signals to laser projection device (LPD) control signals operative for illuminating selected pixels in the raster pattern as the image on the projection surface.

7. The method of claim 6, and the steps of generating the laser beam, oscillating a first scan mirror for sweeping the laser beam along one of the axes, and oscillating a second scan mirror for sweeping the laser beam along the other of the axes.

8. The method of claim 6, and the steps of generating constituent beams which are combined to form the laser beam, oscillating a first scan mirror for sweeping the laser beam along one of the axes, and oscillating a second scan mirror for sweeping the laser beam along the other of the axes.

9. The method of claim 6, wherein the output LCD signals include pixel data, line data and clock data.